United States Patent [19]

Hirasawa

[11] Patent Number: 5,323,200
[45] Date of Patent: Jun. 21, 1994

[54] OPTICAL APPARATUS HAVING LENS CONTROL DEVICE

[75] Inventor: Masahide Hirasawa, Sagamihara, Japan

[73] Assignee: Canon Kabushiki Kaisha, Tokyo, Japan

[21] Appl. No.: 885,308

[22] Filed: May 18, 1992

[30] Foreign Application Priority Data

May 22, 1991 [JP] Japan .................................. 3-146648
May 22, 1991 [JP] Japan .................................. 3-146649

[51] Int. Cl.⁵ .............................................. G03B 1/18
[52] U.S. Cl. .............................................. 351/195.12
[58] Field of Search ........... 354/195.12, 195.1, 195.11, 354/400

[56] References Cited

U.S. PATENT DOCUMENTS

| | | | |
|---|---|---|---|
| 4,847,650 | 7/1989 | Iida et al. ............................ | 354/400 |
| 5,028,773 | 7/1991 | Hata ................................... | 354/195.1 |
| 5,060,001 | 10/1991 | Kaneda ............................... | 354/400 |
| 5,075,713 | 12/1991 | Sakata ................................ | 354/400 |
| 5,144,492 | 9/1992 | Iijima et al. ........................ | 354/400 |
| 5,157,432 | 10/1992 | Fukuoka et al. ..................... | 354/400 |

*Primary Examiner*—Russell E. Adams
*Assistant Examiner*—Nicholas J. Tuccillo
*Attorney, Agent, or Firm*—Robin, Blecker, Daley & Driscoll

[57] ABSTRACT

An optical apparatus is arranged in a compact size and yet to be capable of adequately performing lens control whereby, in the optical system of the apparatus which is of the kind having a focusing lens arranged to compensate for a shift of a focal plane caused by a power varying action, the speed of the movement of a zooming lens is reduced when the speed of the movement of the focusing lens increases following the movement of the zooming lens.

15 Claims, 6 Drawing Sheets

OPTICAL APPARATUS HAVING LENS CONTROL DEVICE

BACKGROUND OF THE INVENTION

1. Field of the Invention

This invention relates to an optical apparatus of the kind having a lens control device for controlling the movement of a lens, such as a camera, a lens unit, a measuring equipment, a projection type TV set or the like.

2. Description of the Related Art

Figure 4:
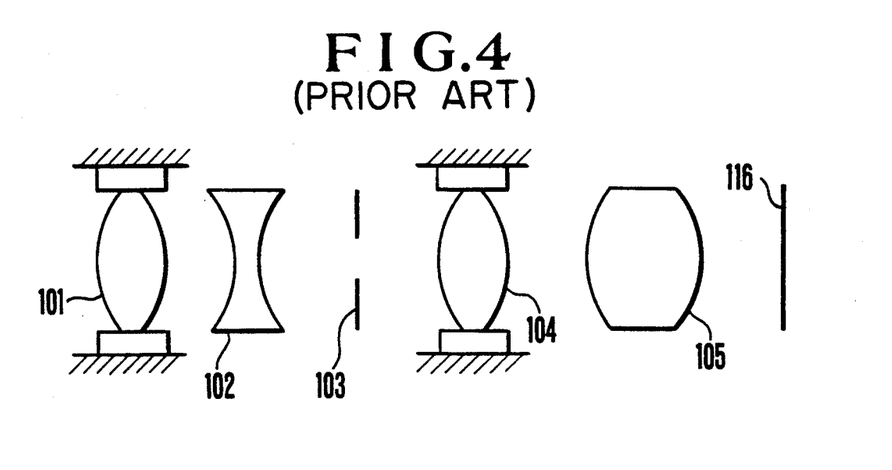
FIG. 4 shows in outline the arrangement of the conventional apparatus.

The volume and the weight of a lens part and an automatic focusing device arranged in a video-integrated type camera have recently come to decrease rapidly to permit a reduction in size and weight of the camera of this type. For this purpose, the automatic focusing device has been changing from an active type which has an infrared ray projecting and receiving means to a passive type which finds an in-focus point through a video signal coming from an image sensor without using the infrared ray projecting and receiving means. As for the lens part, a so-called inner focus type has come to be often used wherein a lens which serves to compensate for a shift of a focal plane caused by a power varying action is arranged to perform also a focus adjusting function so that a front lens located nearest to an object to be photographed can be fixed for reduction in FIG. 4 shows the arrangement of the above-stated inner focus type lens. The illustration includes a first lens group 101 which is fixed; a second lens group 102 which is a zooming lens group performing a power varying action; a diaphragm 103; a third lens group 104 which is fixed; a fourth lens group 105 which is a focusing lens group performing the combined functions of compensating for a shift of a focal plane due to a power varying action and adjusting a focal point; and the image pickup plane 106 of an image sensor. The lens groups, the diaphragm 103 and the image pickup plane 106 are serially disposed one after another on an optical axis.

Figure 5:
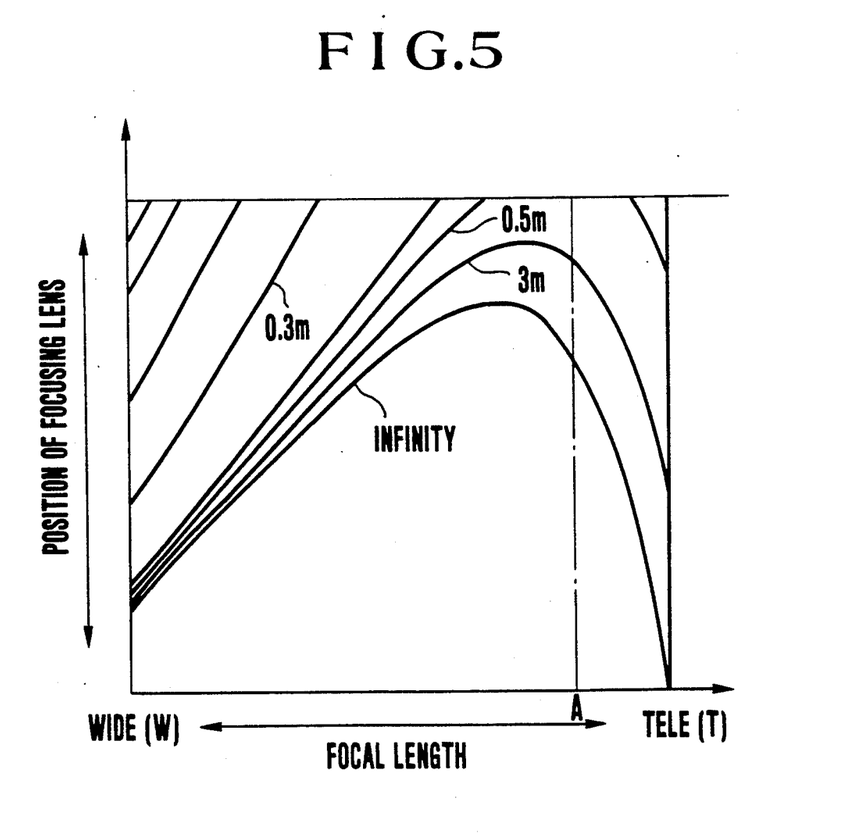
FIG. 5 shows the position of a focusing lens in relation to that of a zooming lens.

FIG. 5 shows changes taking place in position of the fourth lens group 105, in the arrangement shown in FIG. 4, for focus adjustment to each object distance in relation to the changes of focal length, i.e., changes in position of the second lens group 102. When there is no change in the focal length with the second lens group 102 in repose, the fourth lens group 105 makes focus adjustment by moving in parallel to the axis of ordinate for an applicable focal length, as shown in FIG. 5.

During the process of zooming, one of the loci of the fourth lens group 105 as shown in FIG. 5 is selected according to an applicable object distance, and driving control corresponding to the change of the focal length is performed on the fourth lens group 105 according to the locus thus selected. Under this control, an image can be obtained without any blur by adjusting the focus while compensating for any shift of focal plane resulting from power variation even during the process of zooming.

Figure 6:
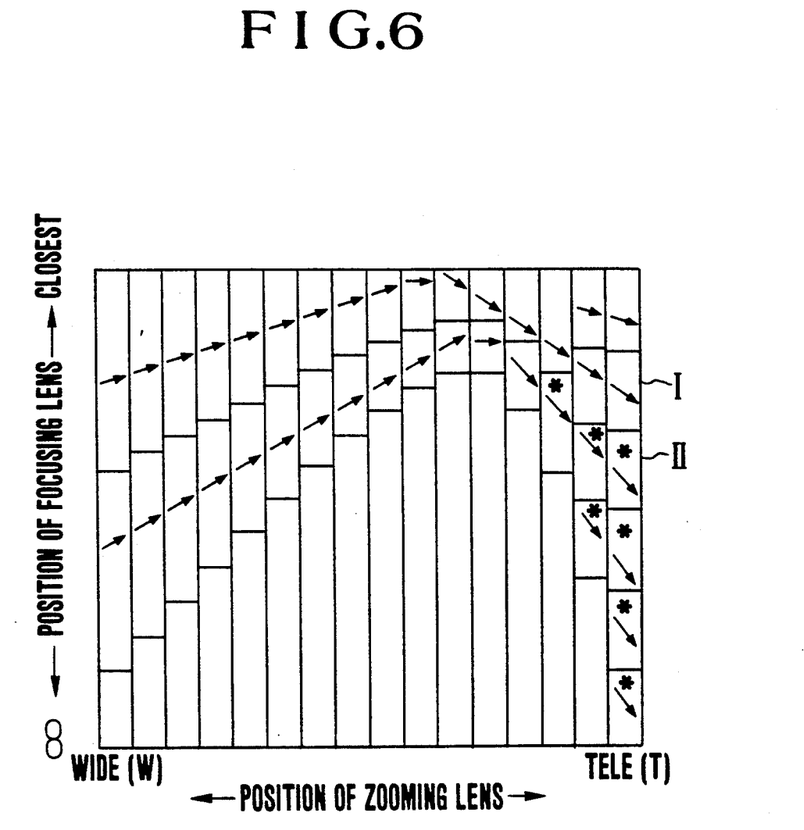
FIG. 6 shows information on the speed of the focusing lens in relation to the position of the zooming lens.

FIG. 6 shows by way of example a case where a zooming-lens moving area shown in FIG. 5 is divided into small areas. In this case, while the zooming-lens moving area is equally divided, the focusing lens positions are grouped together in such a manner that a plurality of loci of the focusing lens position considered to have about the same inclination are included within each of the divided areas of the zooming lens positions. In FIG. 6, arrows which vary their angles from moment to moment represent information on the speed of the fourth lens group 105.

In the case of FIG. 6, the moving range of the second lens group 102, on the axis of abscissa, is divided equally into a total of 16 areas, which hereinafter will be called "zoom zones". When the curves shown in FIG. 5 are divided by these zoom zones, these curves can be grouped into the portion having about the same inclination within each zoom zone. In a case where the speed of zooming is constant, the fourth lens group 105 can be allowed to move at a constant speed irrespectively of variations in the object distance as long as these curves have the same inclination.

Therefore, as shown in FIG. 6, the axis of ordinate is divided for every one of the zoom zones into parts in each of which the above-stated curves have the same inclination. Then, one representative speed is assigned to each of the divided parts. With the lens part arranged in this manner, the moving locus shown in FIG. 5 can be followed always at an optimum moving speed of the fourth lens group 105 by adjusting the lens part to an in-focus position at the beginning of zooming and then by performing the zooming action while detecting the positions of the zooming and focusing lenses.

In FIGS. 5 and 6, a term "WIDE (W)" means a wide-angle state, or a wide-angle end (position), where the zooming lens has the shortest focal length; and a term "TELE (T)" means a telephoto state, or a telephoto end (position), where the zooming lens has the longest focal length.

In the conventional lens control device, the inclination of the movement locus of the fourth lens group suddenly increases relative to the axis of abscissa in the neighborhood of the telephoto end, as shown in FIG. 5. This change indicates a sudden increase in the moving speed of the focusing lens in the neighborhood of the telephoto end. It has been known that this tendency becomes more salient accordingly as the focal length of the lens part increases.

It is, therefore, necessary to use such an actuator that gives a sufficient torque for realizing the speed desired in the neighborhood of the telephoto end. This necessity increases accordingly as the zooming magnification is increased. Generally, however, the actuator has a larger size, makes a larger noise and increases power consumption accordingly as its rotation speed and torque are increased. In other words, a greater zooming magnification necessitates an increase in the maximum drivable speed of a focusing-lens actuator accordingly. Then, it increases the size of the lens part, consumption of electric power and the size of a battery to be used for the camera. These things are detrimental to a reduction in size and weight of the camera.

SUMMARY OF THE INVENTION

One aspect of this invention resides in the provision of a compact optical apparatus which is arranged in a compact size and yet to be capable of adequately performing lens control whereby, in the optical system of the apparatus which is of the kind having a focusing lens arranged to compensate for a shift of a focal plane caused by a power varying action, the moving speed of a zooming lens is decelerated when the moving speed of the focusing lens might increase following the movement of the zooming lens.

The above and other aspects and features of the invention will become apparent from the following detailed description of embodiments thereof taken in conjunction with the accompanying drawings.

DETAILED DESCRIPTION OF THE PREFERRED EMBODIMENTS

Figure 1:
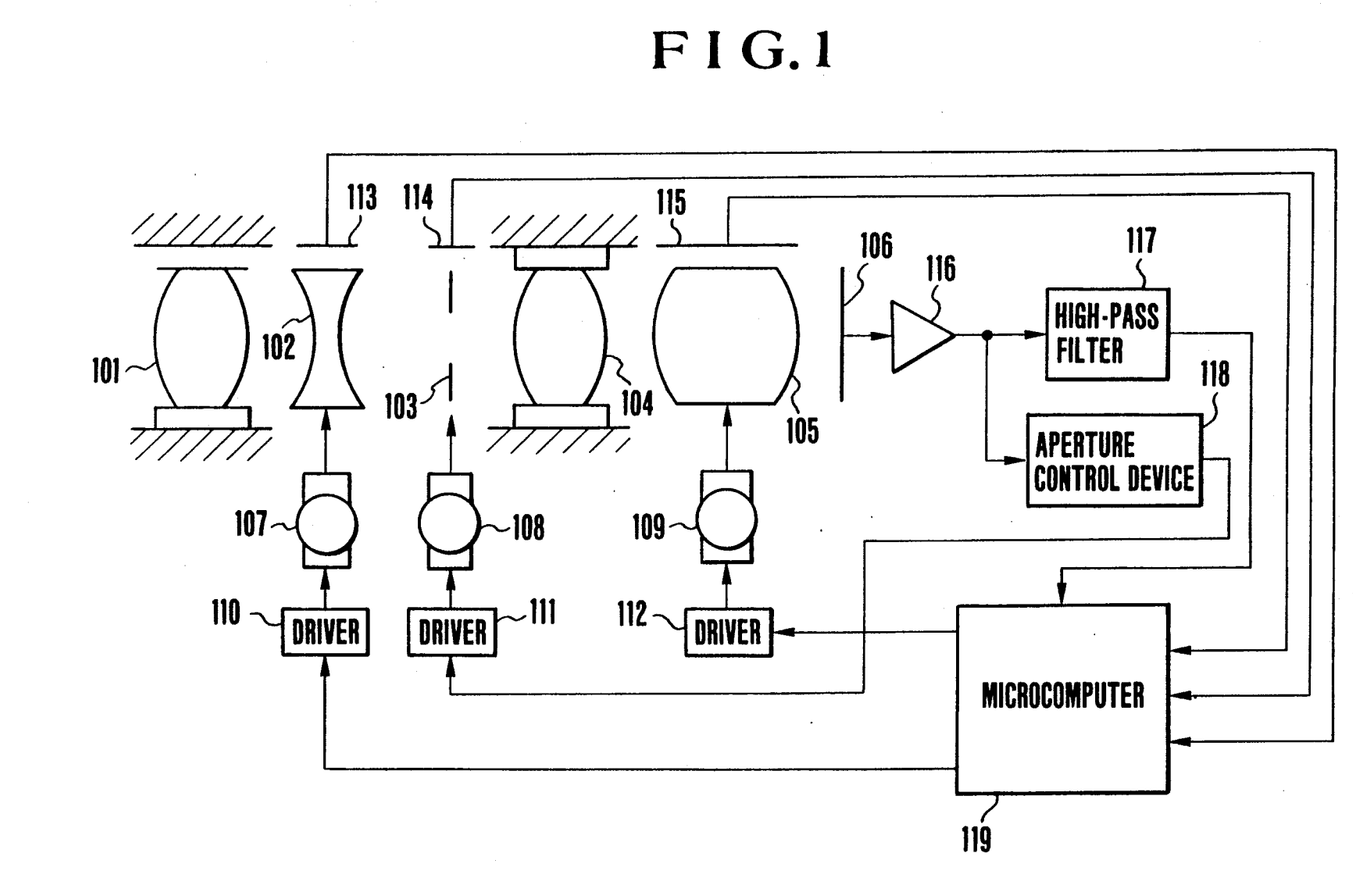
FIG. 1 shows in outline the arrangement of an apparatus arranged as a first embodiment of this invention.

FIG. 1 shows in outline the arrangement of a first embodiment of this invention. In FIG. 1, reference numerals 101, 102, 103, 104, 105 and 106 respectively denote lens groups, a diaphragm and an image pickup plane which have the same functions as the corresponding parts shown in FIG. 4. Actuators 107 and 109 are respectively arranged to drive the second lens group 102 and the fourth lens group 105. Another actuator 108 is arranged to drive the diaphragm 103. Drivers 110, 111 and 112 are arranged to drive respectively the actuators 107, 108 and 109 in accordance with driving instructions. Encoders 113 and 115 are arranged, as lens group position detecting means, to detect the moving positions (states) of the second and fourth lens groups 102 and 105, to convert the positions detected into electrical signals and to output the electrical signals, respectively. Another encoder 114 is arranged to detect the state of the diaphragm 103 and to convert the detected state into an electrical signal. An amplifier 116 is arranged to amplify an electrical signal which is outputted from the image pickup plane 106 of an image sensor according to the quantity of light received. A high-pass filter 117 is arranged to pass a specific frequency signal included in the output signal of the amplifier 116. An aperture control device 118 is arranged to adjust the aperture of the diaphragm 103 according to the output of the amplifier 116 in such a way as to optimize the quantity of light incident on the image pickup plane 106 of the image sensor. A microcomputer 119 serves as control means and is arranged to receive signals from the encoders 113, 114 and 115 and the high-pass filter 117, to perform arithmetic operations on these signals and to output driving instructions to the drivers 110, 111 and 112 for tracing the loci which are shown in FIG. 5. Information on the speeds shown in FIG. 6 mentioned in the foregoing is stored at the microcomputer 119 in a tabulated form. The microcomputer 119 determines a focusing-lens driving speed on the basis of information on the positions of the focusing and zooming lens groups by making reference to the table of speeds thus stored. In the case of this embodiment, the actuator 107 and the driver 110 are arranged as zooming lens group driving means while the actuator 109 and the driver 112 are arranged as focusing lens group driving means.

Figure 2:
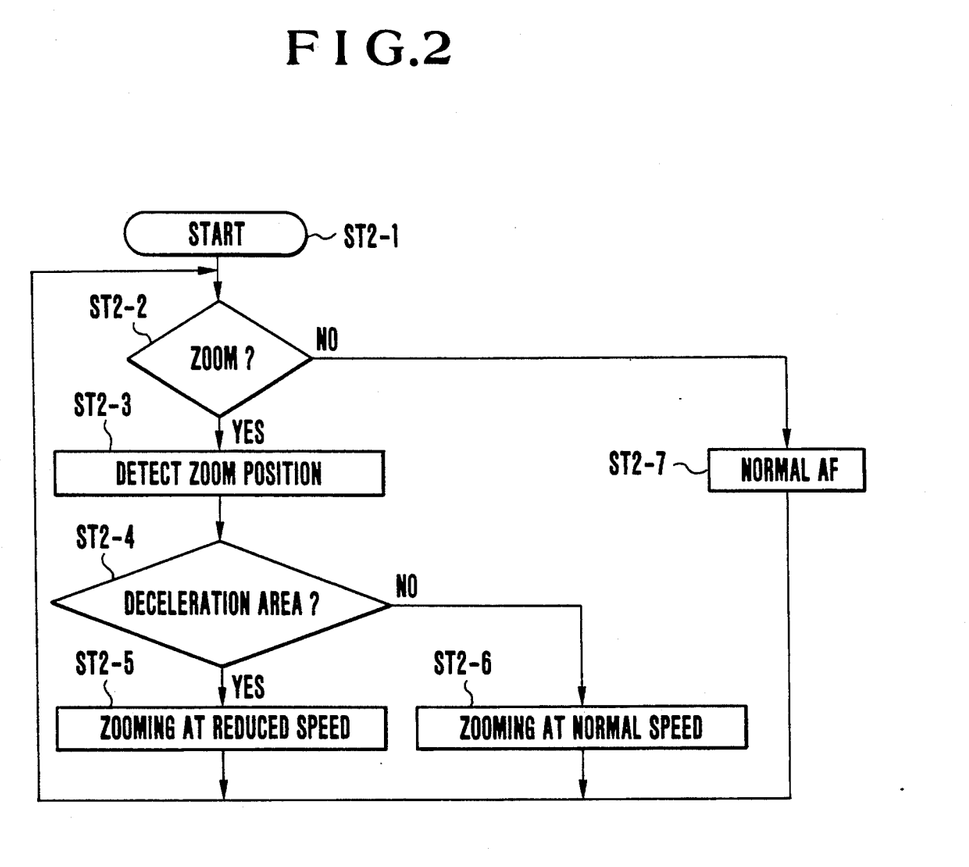
FIG. 2 is a flowchart showing the flow of a program provided within a microcomputer which is included in the apparatus shown in FIG. 1.

FIG. 2 shows the flow of a program which is arranged in the microcomputer 119. The operation of the embodiment is described as follows with reference to FIG. 2: the program begins to be executed at a step ST2-1. At a step ST2-2, a check is made to find if a zoom switch (not shown) has been pushed. If so, the flow comes to a step ST2-3 to detect a zoom position of the second lens group 102 through the value of the output of the encoder 113. From this output value, the zoom zone in which the second lens group 102 is currently located is detected. The flow then comes to a step ST2-4.

At the step ST2-4, a check is made to find, from the zoom position, if the second lens group 102 is located within a deceleration area, which will be described later. If so, the flow comes to a step ST2-5 to reduce a speed at which the zooming lens (the second lens group 102) is driven. If not, the flow comes to a step ST2-6 to drive the zooming lens at a normal speed. In a case where the zoom switch is found not pushed at the step ST2-2, the flow comes to a step ST2-7 to perform a normal AF (automatic focusing) action.

The deceleration area of the zooming lens mentioned above is described as follows: referring to FIG. 5, the inclination of the locus of movement of the fourth lens group 105 becomes steep on the telephoto side of a speed changing boundary A. In this part, the moving amount of the focusing lens becomes larger relative to the moving amount of the zooming lens.

Therefore, if the moving speed of the zooming lens is constant, the actuator for the focusing lens must be driven at a high speed on the telephoto side of the speed varying boundary A. In other words, the speed of driving the focusing lens to trace the movement locus depends on the moving speed of the zooming lens. The moving speed of the focusing lens, therefore, can be kept low by lowering the driving speed of the zooming lens.

In view of the above-stated relation, in the case of this embodiment, the above-stated deceleration area to be detected at the step ST2-4 is considered to be on the telephoto side of the speed changing boundary A. A check is made to find the zoom zone in which the second lens group 102 is currently located among other zoom zones from the zooming position obtained from the encoder 113. If the result of the check indicates that the second lens group 102 is within the deceleration area, the moving speed of the focusing lens is kept low by lowering the moving speed of the zooming lens.

The process mentioned above enables the embodiment to perform adequate lens control without necessitating use of a larger actuator for the focusing lens even if the zoom magnification of the inner focus type lens arrangement is increased.

Figure 3:
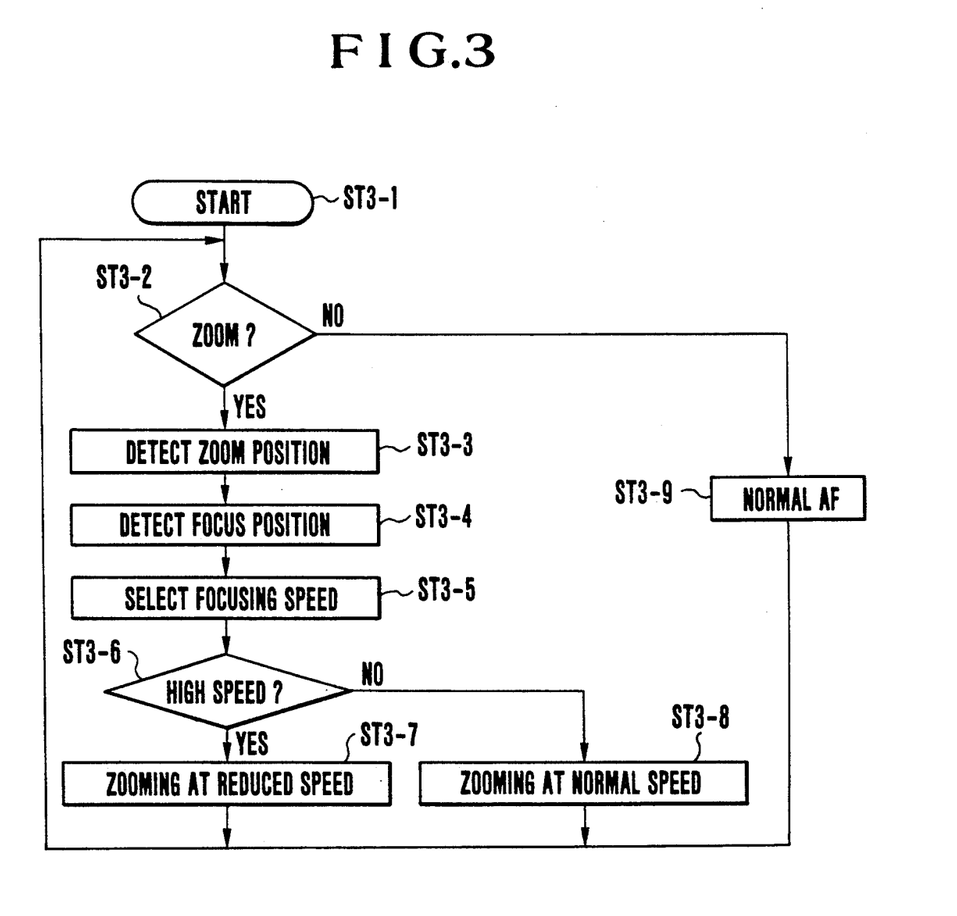
FIG. 3 is a flowchart showing the flow of a program provided within the microcomputer arranged as a second embodiment of this invention.

FIG. 3 is a flowchart showing the flow of a program arranged in the microcomputer 119 as a second embodiment of this invention. Referring to FIG. 3, the program begins to be executed at a step ST3-1. At a step ST3-2, a check is made to find if the zoom switch has been pushed. If so, the flow comes to a step ST3-3 to detect the zoom position of the second lens group 102 from the value of the output of the encoder 113. At a step ST3-4, the focus position of the fourth lens group 105 is detected from the value of the output of the encoder 115. At a next step ST3-5, one of the divided areas of the speed table shown in FIG. 6 is specified to be selected according to the above-stated zoom and focus positions. After that, the representative speed of the divided area thus specified is set as a driving speed for the focusing lens in the zooming process. At a step ST3-6, a check is made, by a method which will be described hereinafter, to find if the selected driving speed of the focusing lens is a high speed for the actuator for the focusing lens.

Whether or not the selected driving speed of the focusing lens is too high for the actuator for the focusing lens in use can be determined in the stage of designing. If the result of the check made at the step ST3-6 indicates that the speed is too high, therefore, a flag is set to show that the speed is too high for every applicable divided area, as indicated by marks * in areas located on the telephoto side in FIG. 6. In a case where the area for which this flag is set is selected, the flow comes to a step ST3-7. At the step ST3-7, a necessary process is performed to reduce the driving speed of the zooming lens in such a way as to avoid overloading the actuator for the focusing lens. If an area for which the above-stated flag is not set is selected, the flow comes to a step ST3-8 to have the zooming lens driven at a normal speed. Further, if the result of the check made at the step ST3-2 indicates that the zoom switch is not pushed, the flow comes to a step ST3-9 to perform a normal AF action.

Figure 7:
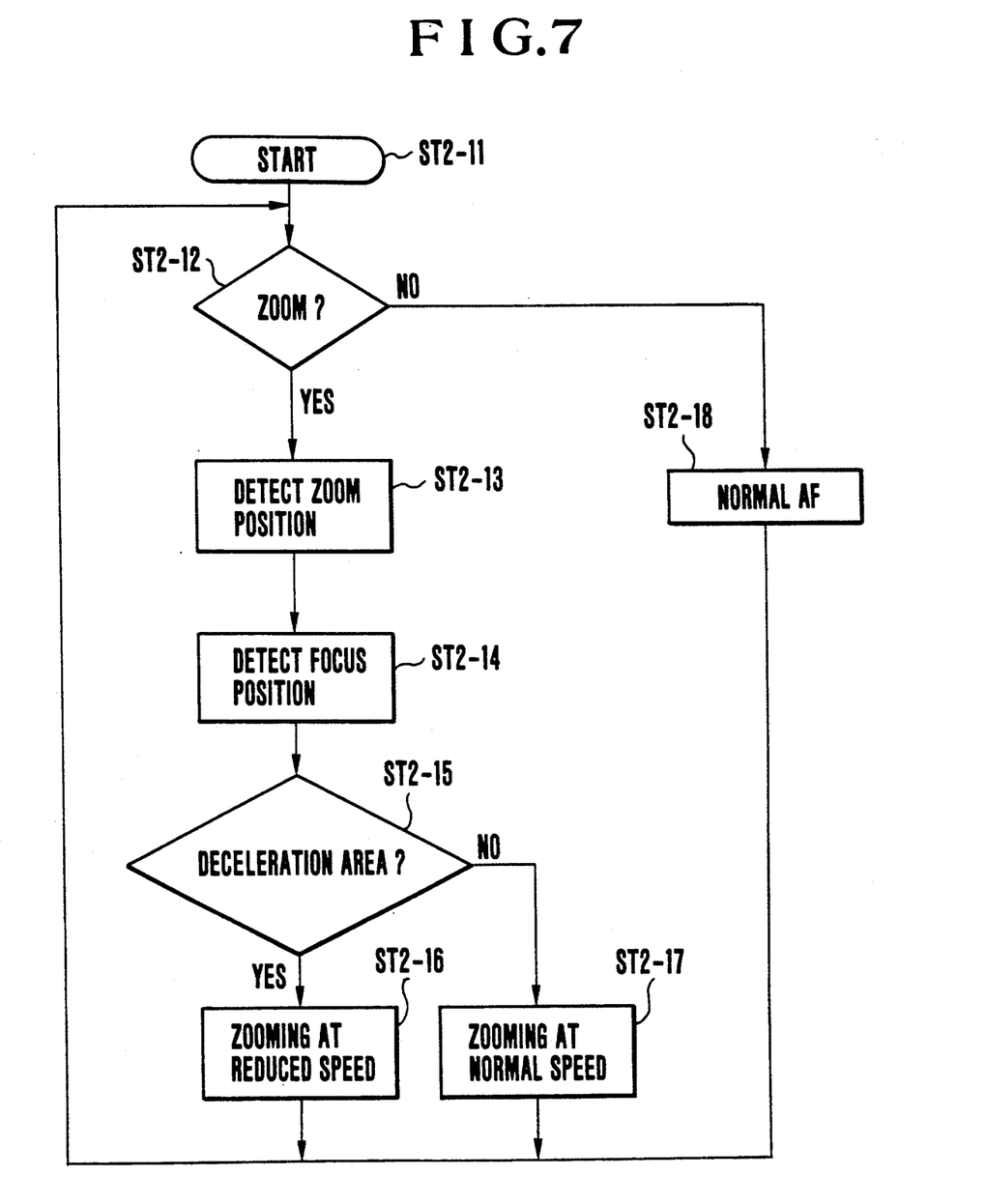
FIG. 7 is a flowchart showing the flow of a program which is arranged as a third embodiment of this invention.

FIG. 7 shows the flow of a program arranged in the microcomputer 119 as a third embodiment of this invention. The operation of the embodiment is described as follows with reference to FIG. 7: at a step ST2-11, the execution of the program begins. At a step ST2-12, a check is made to find if a zoom switch which is not shown has been pushed. If so, the flow comes to a step ST2-13 to find the zoom position of the second lens group 102 from the value of the output of the encoder 113. Then, through this output value, one zoom zone in which the second lens group 102 is currently located among the zoom zones shown in FIG. 6 is detected. After that, the flow comes to a step ST2-14 to detect the focus position of the fourth lens group 105.

At a step ST2-15, a check is made to find, from the above-stated zoom and focus positions, if the second lens group 102 is in a deceleration area which will be described hereinafter. If so, the flow comes to a step ST2-16 to reduce the driving speed of the zooming lens. If not, the flow comes to a step ST2-17 to have the zoom lens driven at a normal speed. Meanwhile, if the result of the check made at the step ST2-12 indicates that the zoom switch is not pushed, the flow comes to a step ST2-18 to perform a normal AF action.

As described in the foregoing, the deceleration area of the zooming lens is provided for the following reason: referring again to FIG. 5, the inclination of the locus of movement of the fourth lens group 105 becomes steep on the telephoto side of a speed changing boundary A. In this part, the moving amount of the focusing lens increases relative to that of the zooming lens. Therefore, if the moving speed of the zooming lens is constant, the actuator for focusing lens must be driven at a higher speed on the telephoto side of the speed varying boundary A. In other words, the speed of driving the focusing lens to trace the movement locus depends on the moving speed of the zooming lens. The moving speed of the focusing lens can be kept low by lowering the driving speed of the zooming lens.

In the case of the third embodiment, therefore, the deceleration area to be detected at the step ST2-15 is considered to be on the telephoto side of the speed varying boundary A. The zoom zone in which the second lens group 102 is currently located is detected from information on the zoom position obtained from the encoder 113 and information on the focus position obtained from the encoder 115. If the zoom zone thus detected is within the deceleration area, the process of lowering the moving speed of the zooming lens is performed to keep the moving speed of the focusing lens low.

This speed lowering process enables the embodiment to adequately perform lens control with the lens part kept in a compact size without increasing the size of the actuator for focusing lens, even in cases where the zooming magnification of the inner focus type lens is increased.

Each of the first, second and third embodiments described above is arranged to lower the driving speed of the zooming lens in the area where the driving speed of the focusing lens must be lowered when a zooming action is performed on the inner focus type lens part. Therefore, the lens control can be adequately performed without increasing the size of the actuator for the focusing lens for keeping the lens part in a compact size. Further, in accordance with this invention, the zooming magnification can be increased without lowering the AF performance during the process of zooming.

What is claimed is:

1. An optical apparatus comprising;
    a) a first lens arranged to be movable to perform a power varying action;
    b) a second lens arranged to be movable to compensate for a focus position following the movement of said first lens, said second lens also being arranged to be movable alone for performing a focusing action;
    c) first driving means for driving said first lens so as to move said first lens;
    d) second driving means for driving said second lens so as to move said second lens; and
    e) control means for operating said second driving means to cause said second lens to move in a direction for compensating for said focus position following the movement of said first lens driven by said first driving means, said control means being arranged to cause the speed of movement of said first lens driven by said first driving means to be lower than a speed obtained under other conditions upon occurrence of a specific condition under which the speed of movement of said second lens must be increased.

2. An apparatus according to claim 1, wherein said control means is arranged to control said second driving means by reading out, from a memory, information on the speed of movement of said second lens corresponding to the moving position of said first lens.

3. An apparatus according to claim 1, wherein said control means is arranged to cause, when said first lens has moved to a preset telephoto area, the speed of movement of said first lens to be lower than when said first lens is within a wide-angle area.

4. An apparatus according to claim 1, wherein said control means is arranged to vary the speed of movement of said first lens on the basis of information on the positions of said first and second lenses.

5. An apparatus according to claim 4, wherein said control means is arranged to cause, in a case where said first lens has moved to a preset telephoto area and said second lens is located in a preset area, the speed of movement of said first lens to be slower than in other cases.

6. An apparatus according to claim 1, wherein said optical apparatus is a video camera.

7. An apparatus according to claim 1, further comprising:
an image sensor arranged to receive light which has passed through said first and second lenses; and
focus detecting means for detecting a focusing state from a video signal coming from said image sensor.

8. An apparatus according to claim 7, further comprising second control means arranged to control said second driving means so as to move said second lens on the basis of an output of said focus detecting means.

9. An apparatus according to claim 3, wherein sad control means is arranged to cause the speed of movement of said first lens to be constant when said first lens has moved to an area other than the preset telephoto area.

10. An optical apparatus comprising:
a) a first lens arranged to be movable to perform a power varying action;
b) a second lens arranged to be movable to compensate for a focus position following the movement of said first lens, said second lens also being arranged to be movable alone for performing a focusing action;
c) first driving means for driving said first lens so as to move said first lens;
d) second driving means for driving said second lens so as to move said second lens; and
e) control means for operating said second driving means to cause said second lens to move in a direction for compensating for said focus position following the movement of said first lens driven by said first driving means, said control means being arranged to control the speed of movement of said first lens on the basis of speed information of the movement of said second lens, information on the position of said first lens and information on the position of said second lens.

11. An apparatus according to claim 10, wherein said control means is arranged to control said second driving means by reading out, from a memory, information on the speed of movement of said second lens corresponding to the moving position of said first lens.

12. An apparatus according to claim 10, wherein said control means is arranged to cause, in a case where said first lens has moved to a preset telephoto area and said second lens is located in a preset area, the speed of movement of said first lens to be slower than in other cases.

13. An apparatus according to claim 10, wherein said optical apparatus is a video camera.

14. An apparatus according to claim 13, further comprising:
an image sensor arranged to receive light which has passed through said first and second lenses; and
focus detecting means for detecting a focusing state from a video signal coming from said image sensor.

15. An apparatus according to claim 14, further comprising second control means arranged to control said second driving means so as to move said second lens on the basis of an output of said focus detecting means.

* * * * *